United States Patent
Van Endert

(10) Patent No.: US 7,602,682 B2
(45) Date of Patent: Oct. 13, 2009

(54) METHOD AND APPARATUS FOR DETERMINING AN OPTIMUM POWER LEVEL

(75) Inventor: Tony Petrus Van Endert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 449 days.

(21) Appl. No.: 10/556,116

(22) PCT Filed: May 5, 2004

(86) PCT No.: PCT/IB2004/050592

§ 371 (c)(1),
(2), (4) Date: Nov. 8, 2005

(87) PCT Pub. No.: WO2004/100137

PCT Pub. Date: Nov. 18, 2004

(65) Prior Publication Data

US 2006/0285459 A1    Dec. 21, 2006

(30) Foreign Application Priority Data

May 9, 2003    (EP) .................................. 03076427

(51) Int. Cl.
*G11B 7/00* (2006.01)
(52) U.S. Cl. .................................. 369/47.53; 369/53.34

(58) Field of Classification Search .................. None
See application file for complete search history.

(56) References Cited

U.S. PATENT DOCUMENTS

| | | | |
|---|---|---|---|
| 5,341,360 | A | 8/1994 | Johann et al. |
| 6,067,284 | A | 5/2000 | Ikeda et al. |
| 6,538,968 | B1 | 3/2003 | Yamaguchi et al. |
| 2001/0026516 | A1 | 10/2001 | Shoji et al. |
| 2002/0003760 | A1 | 1/2002 | Honda |
| 2002/0031060 | A1* | 3/2002 | Mashimo et al. .......... 369/44.29 |
| 2002/0085462 | A1 | 7/2002 | Spruit |
| 2002/0085463 | A1* | 7/2002 | Minemura et al. ....... 369/47.53 |
| 2002/0098806 | A1* | 7/2002 | Park .......................... 455/67.6 |
| 2002/0136123 | A1* | 9/2002 | Ogawa .................... 369/47.53 |
| 2002/0154587 | A1 | 10/2002 | Yamada |
| 2003/0058765 | A1* | 3/2003 | Schreurs et al. .......... 369/47.53 |
| 2004/0017750 | A1* | 1/2004 | Hsu et al. ................. 369/47.53 |

FOREIGN PATENT DOCUMENTS

EP    0404249 A1    12/1990

* cited by examiner

*Primary Examiner*—Wayne R Young
*Assistant Examiner*—Lixi Chow

(57) ABSTRACT

A fast optimum power control method is disclosed, with a laser power level being adjusted in a predetermined sequence at an ADIP/ATIP frame of an optical recording medium. Jitter is measured at each ADIP/ATIP frame in order to obtain an average jitter value for that particular frame, and hence power level.

20 Claims, 7 Drawing Sheets

First revolution
Power    Jitter

| $P_0$ | $\sigma_{0.1}$ |
| $P_1$ | $\sigma_{1.1}$ |
| $P_2$ | $\sigma_{2.1}$ |
| $P_3$ | $\sigma_{3.1}$ |
| $P_4$ | $\sigma_{4.1}$ |
| $P_5$ | $\sigma_{5.1}$ |
| $P_6$ | $\sigma_{6.1}$ |

Second revolution
Power    Jitter

| $P_0$ | $\sigma_{0.2}$ |
| $P_1$ | $\sigma_{1.2}$ |
| $P_2$ | $\sigma_{2.2}$ |
| $P_3$ | $\sigma_{3.2}$ |
| $P_4$ | $\sigma_{4.2}$ |
| $P_5$ | $\sigma_{5.2}$ |
| $P_6$ | $\sigma_{6.2}$ |

FIG.5 p:0 → n-2: 0 → 5

| $Po_0$ | $\sigma rl_0$ |
| $Po_1$ | $\sigma rl_1$ |
| $Po_2$ | $\sigma rl_2$ |
| $Po_3$ | $\sigma rl_3$ |
| $Po_4$ | $\sigma rl_4$ |
| $Po_5$ | $\sigma rl_5$ |

FIG.6

| First revolution | | Second revolution | |
|---|---|---|---|
| Power | Jitter | Power | Jitter |
| $P_0$ | $\sigma_{0.1}$ | $P_0$ | $\sigma_{0.2}$ |
| $P_1$ | $\sigma_{1.1}$ | $P_1$ | $\sigma_{1.2}$ |
| $P_2$ | $\sigma_{2.1}$ | $P_2$ | $\sigma_{2.2}$ |
| $P_3$ | $\sigma_{3.1}$ | $P_3$ | $\sigma_{3.2}$ |
| $P_4$ | $\sigma_{4.1}$ | $P_4$ | $\sigma_{4.2}$ |
| $P_5$ | $\sigma_{5.1}$ | $P_5$ | $\sigma_{5.2}$ |
| $P_6$ | $\sigma_{6.1}$ | $P_6$ | $\sigma_{6.2}$ |

| | |
|---|---|
| $Po_0$ | $\sigma r2_0$ |
| $Po_1$ | $\sigma r2_1$ |
| $Po_2$ | $\sigma r2_2$ |
| $Po_3$ | $\sigma r2_3$ |
| $Po_4$ | $\sigma r2_4$ |

FIG.8

METHOD AND APPARATUS FOR DETERMINING AN OPTIMUM POWER LEVEL

The present invention relates generally to recordable optical storage systems, and more specifically to a method of and an apparatus for determination of an optimal laser power for use with recordable optical storage systems and optical storage discs.

As is well known, CD-R (Compact Disc-Recordable) discs and the like are made up of an optical stack. The stack commonly consists of polycarbonate substrate, a sensitive dye layer, a gold or silver alloy reflector and a protective lacquer coating. Data is written to a disc by focusing a high power laser onto the dye layer so as to heat an area such that the reflectivity of the area is altered. The areas form a spiral track of variable length marks (low reflective areas), and lands (highly reflective areas between the marks). The resulting pattern of the marks and lands encodes the data to be stored on the disc. Each transition between a mark area and a land area corresponds to the physical encoding of a data "1" value. The lands are typically 3 to 11 clock cycles in length (3T to 11T where 'T' represents the data clock period).

Precise mark length is critical if data is to be represented accurately. For example, if an optical reader reads a disc with a number of 3T marks or lands that are too long, these could be misinterpreted as 4T features. This misinterpretation may result in incorrect data retrieval, and, in extreme cases, read-failure.

For this reason, it is essential that optical recorders are able to monitor and maintain the quality of disc writing in order to ensure the accuracy of all the mark and land lengths over the particular disc being written.

In order to achieve accurate mark/land lengths, there will be an optimum laser recording power for the disc/recorder combination being used. The optimum laser recording power that should be used when recording a disc (e.g. CD-R, CD-RW (Compact Disc-ReWritable), DVD±R (DVD Recordable), DVD±RW (DVD ReWritable), DVD-RAM etc.) is therefore dependent upon the actual disc, the recorder being used and also the speed at which the recording is taking place.

The optimum laser recording power should be determined for each recorder/disc combination at the actual recording speed. Such determination is called an Optimum Power Control (OPC) procedure. The optimum laser recording power will allow the recorder to produce the correct mark/land lengths for a given disc at a given recording speed.

Two different OPC procedures are currently in use for Recordable (R), and ReWriteable (RW) optical storage discs. For R-discs 'beta' and 'jitter' (or 'sigma') OPC methods are generally used, whilst for RW-discs a 'gamma' method is used as the OPC procedure. The jitter/sigma OPC procedure is one of the most commonly used methods. Jitter is a statistical measurement of the variation in mark or land length around a mean value for each run length, and is a general measure of timing errors which occur when a player/recorder reads data.

These presently used OPC methods are based upon information being used which is pre-stored on the disc (see for example DVD+R, Basic Format Specification, System Description, or Recordable Compact Disc Systems, Part II: CD-R, System Description). Information may be pre-stored onto a disc which provides a recorder for example with an indicative power level with which to begin an OPC procedure. This information may not, however, always be correct, and can result in OPC failure.

A further disadvantage of presently used jitter/sigma OPC procedures is the requirement for large amounts of disc area for recording test patterns in order to average out variations (such as disc eccentricity for example) along the circumference of the disc. The large test areas which are needed detract from the space available for data storage, and the tests also take a long time to perform.

There is therefore a need for a fast, space efficient sigma ($\sigma$) OPC method which is also independent of information stored on a disc.

According to the present invention there is provided a fast $\sigma$-OPC procedure which may be executed at inner and/or outer test zones of a disc, and which overcomes the problems associated with conventional jitter OPC procedures.

According to a first aspect of the present invention there is provided a method of determining an optimum power level for a laser device for writing to an optical storage medium, the method comprising defining a test region of the optical storage medium, using a laser device having an operating output power level, writing a predetermined data pattern to the test region, measuring jitter values for the predetermined data pattern, and selecting an optimum operating output power level of the laser device for writing data to the optical storage medium in dependence upon the measured jitter values, the optimum power level minimising the jitter value for the optical storage medium, characterised in that, during writing of the predetermined data pattern to the test region in a first scan of the medium, the operating output power level of the laser device is varied according to a first predetermined profile, and, during writing of the predetermined data pattern to the test region in a second scan of the medium, the operating output power level of the laser device is varied according to a second predetermined profile, different to the first predetermined profile.

According to a second aspect of the present invention there is provided apparatus for determining an optimum power level for a laser device for writing to an optical storage medium, the apparatus comprising, means for defining a test region of the optical storage medium, a laser device having an operating output power level, operable to write a predetermined data pattern to the test region, means for measuring jitter values for the predetermined data pattern, and means selecting an optimum operating output power level of the laser device for writing data to the optical storage medium in dependence upon the measured jitter values, the optimum power level minimising the jitter value for the optical storage medium, characterised by power adjustment means operable, during writing of the predetermined data pattern to the test region in a first scan of the medium, to vary the operating output power level of the laser device according to a first predetermined profile, and, during writing of the predetermined data pattern to the test region in a second scan of the medium, to vary the operating output power level of the laser device according to a second predetermined profile, different to the first predetermined profile.

Laser write power is stepped every ADIP/ATIP (Address in Pre-groove/Absolute Time in Pre-groove) frame, and at each power step jitter is measured a number times (after writing is finished) in order to obtain an average for that ADIP/ATIP frame (and hence power level).

According to the present invention, the laser write power may also be stepped a number of times per ADIP/ATIP frame.

The method of the present invention provides significant advantages over presently used OPC procedures in terms of speed, disc space usage, and due to the fact that it may be used for all recordable optical storage disc media independently of the information pre-stored thereon (e.g. CD-R, CD-RW, DVD±R, DVD±RW, DVD±R_DL (DL=Double Layer), DVD±RW_DL, DVD-RAM, Blu-ray Disc, etc.).

In an exemplary embodiment of the present invention, a two track jitter OPC procedure is provided.

These and other objects, features and advantages of the invention will be apparent from the following more particular descriptions of embodiments of the invention as illustrated in the accompanying drawings, where FIG. 1 represents a side view of typical CD-RW disc;

FIG. 5 depicts arrays of power and jitter values according to an exemplary embodiment of the present invention;

FIG. 6 depicts arrays of average power and jitter values according to an exemplary embodiment of the present invention;

Figure 9:
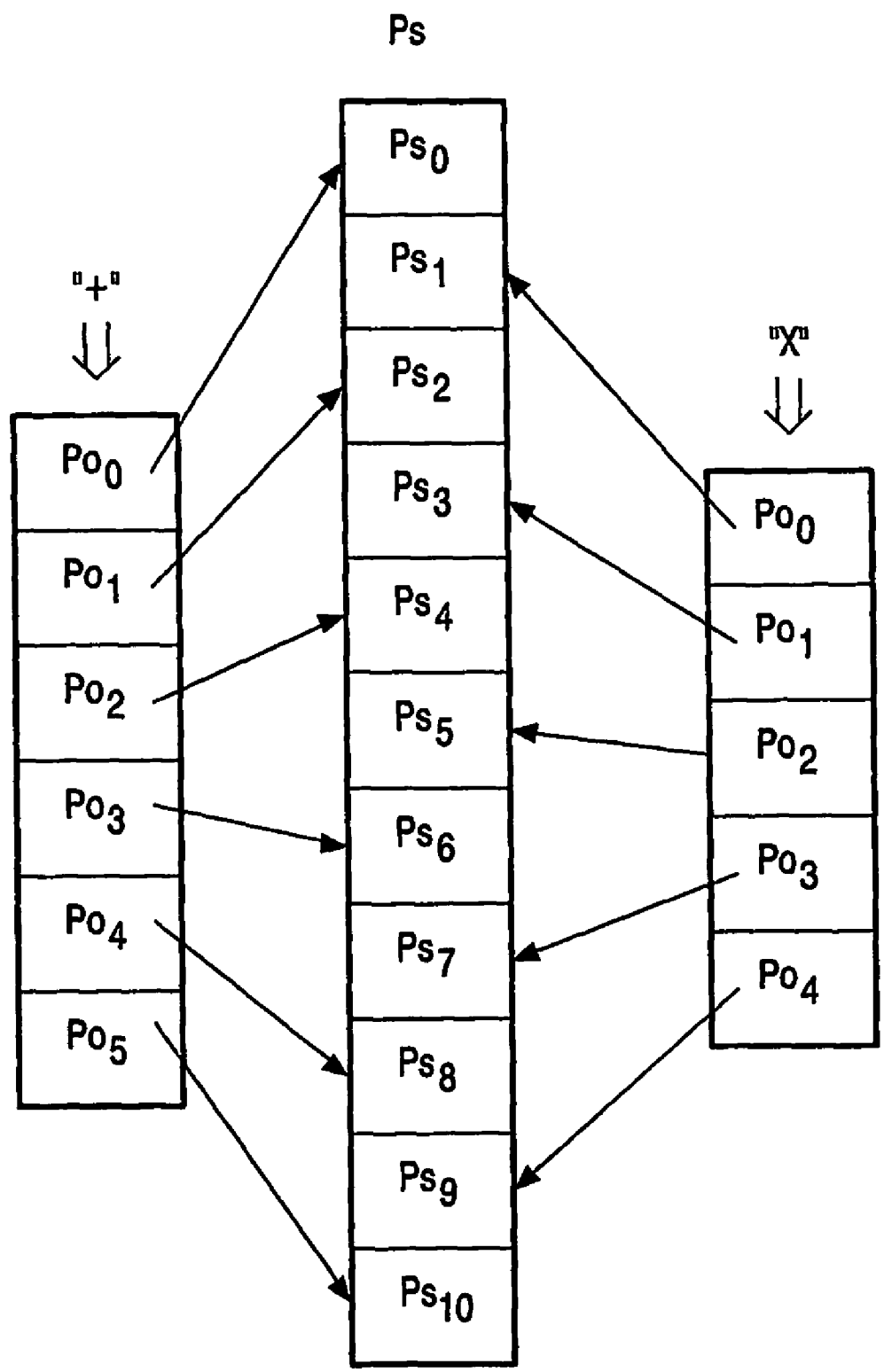
Figure 10:
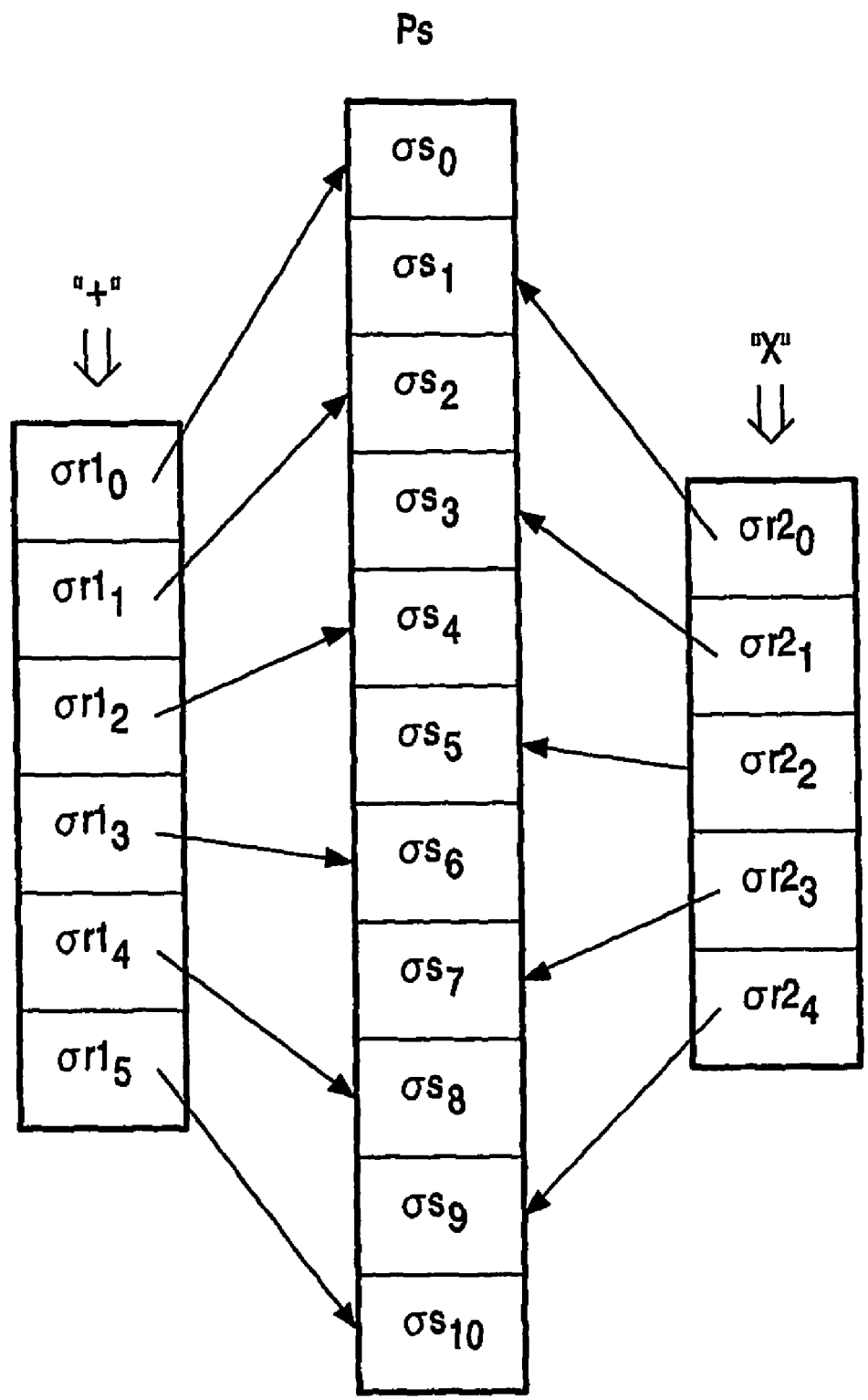
Figure 11:
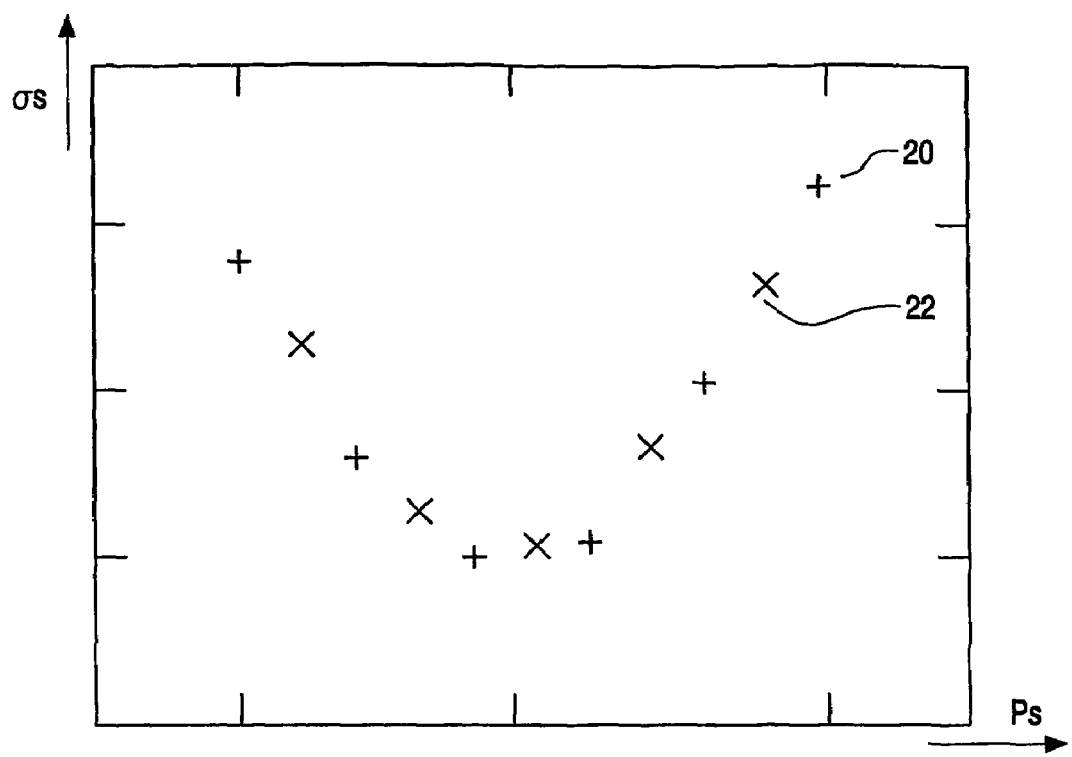
Figure 12:
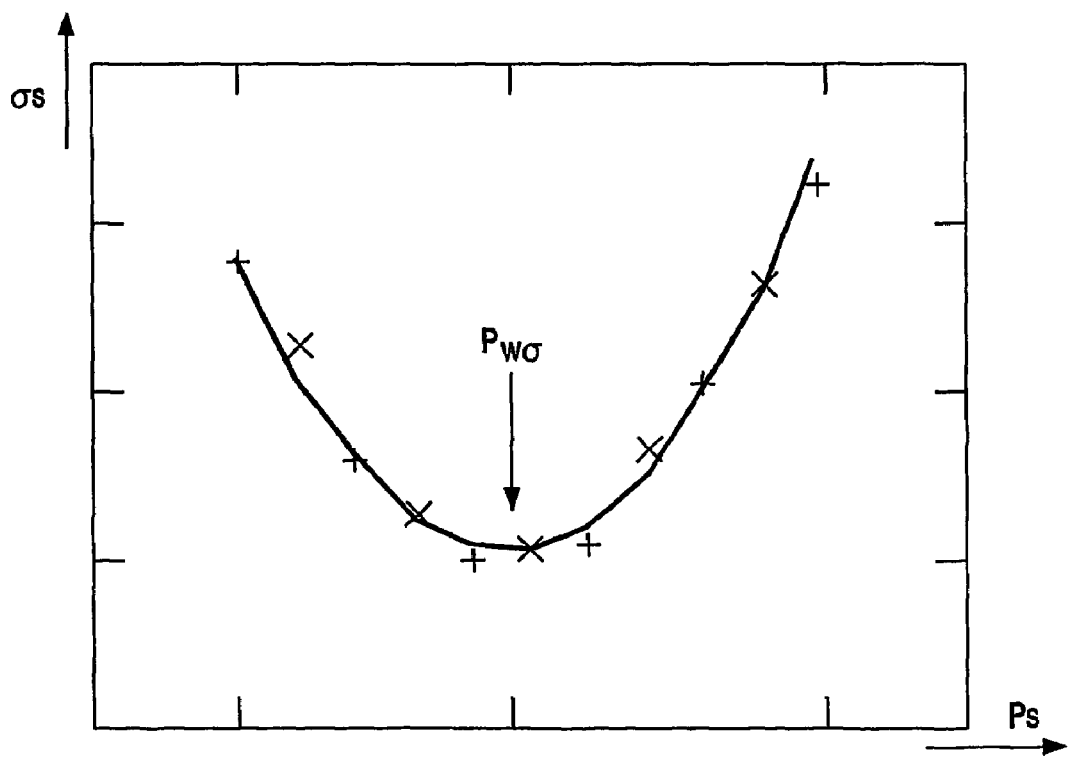

FIG. 7 further depicts arrays of power and jitter values according to an exemplary embodiment of the present invention;

FIG. 8 further depicts arrays of average power and jitter values according to an exemplary embodiment of the present invention;

FIG. 9 depicts an array of average power values according to an exemplary embodiment of the present invention;

FIG. 10 depicts an array of average jitter values according to an exemplary embodiment of the present invention;

FIG. 11 is a graph of average jitter measurement versus average power level in accordance with an exemplary embodiment of the present invention; and FIG. 12 is a further graph of average jitter measurement versus average power level in accordance with an exemplary embodiment of the present invention.

The σ-OPC procedure of the present invention is executed using the test zones of a disc. In order to provide fast and space efficient OPC, an embodiment of the present invention provides an σ-OPC procedure using only two revolutions of the disc.

Although the present invention will be described primarily with reference to CD-R(W) and DVD-R(W) discs, it will be appreciated that the present invention is applicable to any optical recording medium where an optimum laser power is desired for writing information to the medium. For example the present invention is also applicable, but not limited, to DVD-R_DL, DVD-RW_DL, and Blu-ray Disc, etc.

Figure 1:
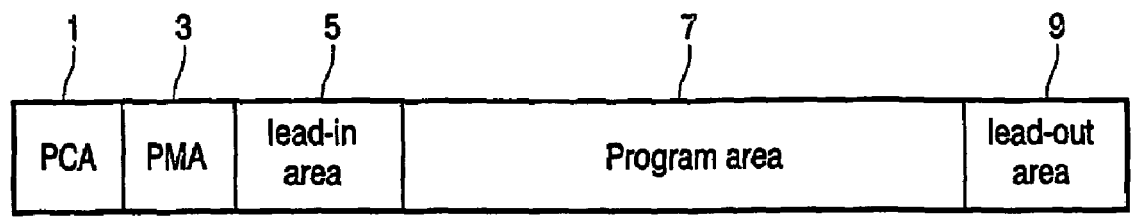

FIG. 1 shows a side view of a standard CD-RW disc. A 'power-calibration area' (PCA) 1 is defined as a test zone for the disc, and any OPC procedure is generally carried out in this region of the disc. A program memory area (PMA) 3, lead-in and lead-out areas 5,9 and program area 7 are provided on the disc, but are not relevant to the present invention, and will not therefore be discussed. The areas 3, 5, 7, and 9 are merely included for completeness, and to emphasise that the present invention is applicable to all standard disc types.

The present invention utilises so-called 'ADIP' (ADdress in Pre-Groove) and 'ATIP' (Absolute Time In Pre-Groove) frames present on optical recording media.

All discs have a pre-cut spiral groove that oscillates slightly. The groove keeps the write head tracking properly, and the oscillation (sinusoidal with a frequency of 22.05 KHz at nominal speed for CD-R(W) discs) provides timing information to the recorder.

The oscillation is frequency-modulated with a +/−1 KHz signal, which creates an absolute time clocking signal, known as the Absolute Time In Pregroove (ATIP). The oscillation can therefore be thought of as providing a timing signal. For DVD+R(W) discs the oscillation has a frequency of 817 kHz at nominal speed. For DVD-R(W) discs the frequency of oscillation at nominal speed is 140.6 kHz. Timing information comes from this modulated signal.

When information is read from the disc the oscillation can be demodulated to form the timing signal from which time information may be derived. Thus the position on the disc during writing/reading can be determined by this ATIP (Absolute Time In Pre-groove) information.

For DVD+R(W) discs there is a phase modulated time signal. In the same fashion to CD-R(W) discs, time information may be derived from the phase oscillation in order to give the position of the disc during reading/writing. This information is called ADIP (ADdress In Pre-groove) for DVD-R(W) discs.

There are certain number of ADIP/ATIP frames per disc revolution. According to the present invention, the OPC procedure is carried out on a small area of a disc, so that a constant number of ATIP/ADIP frames per revolution are used. Specifically, according to an exemplary embodiment of the present invention, 9 ATIPs frames are used for CD-R(W) discs, and 7 ADIP frames are used for DVD-R(W) discs per revolution (at the inside of the optical disc).

Figure 2:
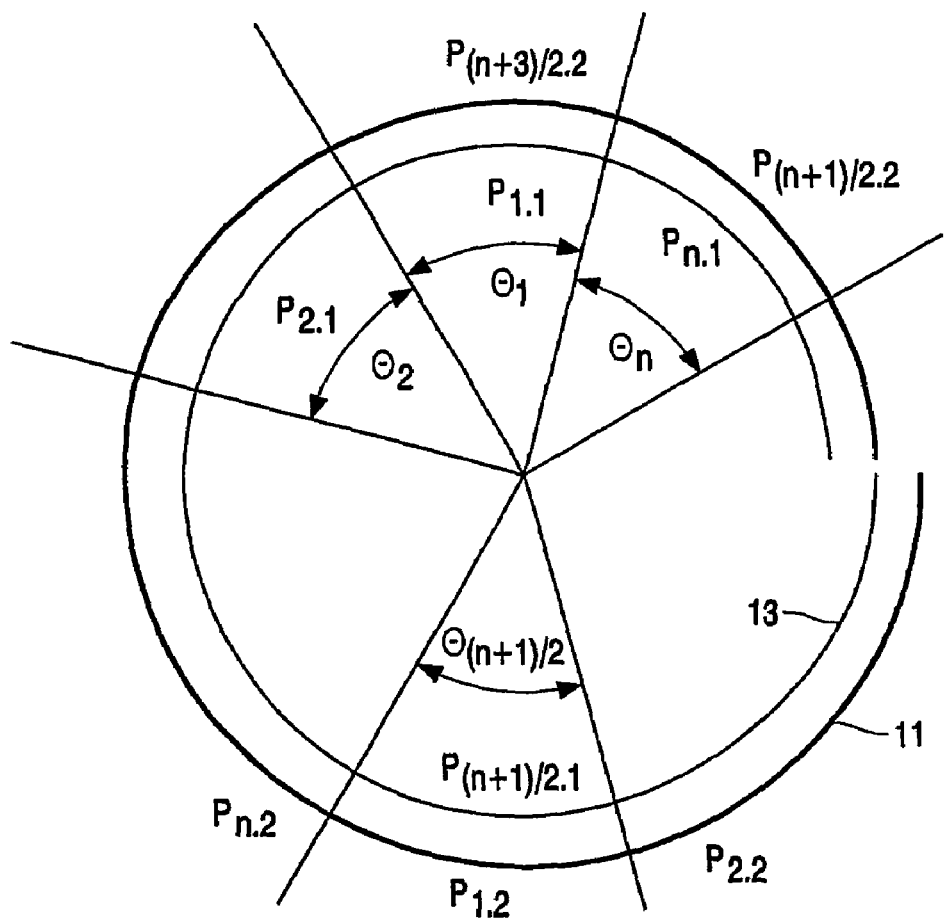
FIG. 2 represents a two-track OPC procedure in accordance with the present invention.
Figure 3:
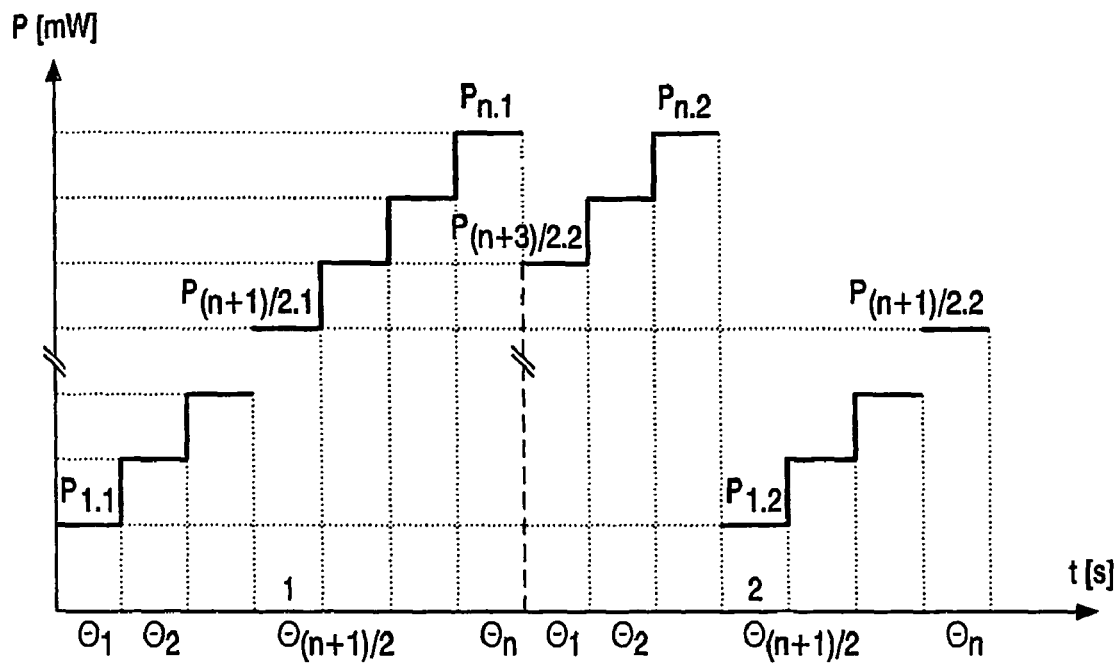
FIG. 3 is a graph representing adjustments made to laser power levels in accordance with the present invention.

FIG. 2 shows a two-track σ-OPC procedure in accordance with the present invention, and FIG. 3 illustrates power level changes during that procedure.

According to the embodiment exemplified by FIGS. 2 and 3, the laser power level is changed for each ADIP/ATIP frame, θ. The power level is determined by dividing the difference between the minimum and maximum laser write powers available for a given recorder/disc combination and the number of steps required. The minimum and maximum laser write powers may, for example be pre-programmed parameters of the recorder.

Alternatively, a standard start power could be used which is then stepped by a predetermined amount every time a new power level is required.

During a first revolution, test data is written to a disc at a particular laser power level in an ADIP/ATIP frame. The laser power level is then adjusted as shown in FIG. 3 and the test data is written to the next ADIP/ATIP frame at this new power level. The procedure continues for the first revolution of the disc until the desired number of power levels have been sampled. The same procedure is then followed for a second revolution with the power levels changed as shown in FIG. 3.

As shown in FIG. 2, the power level changes during the second revolution 11 are different in sequence to those used during the first revolution 13. This shift ensures that ADIP/ATIP frames written with a given power level during the first and second revolutions will not coincide on the disc.

According to the exemplary embodiment of the present invention as shown in FIGS. 2 and 3, at the start of writing the next track 11 the sequence of power levels 103 are changed as shown in FIG. 3. In this way, any possible problems associated with non-homogeneities of the disc along its circumference are averaged out.

Specifically, adjacent ATIP/ADIP frames in concentric tracks do not contain information written at the same laser power level. As a result, a non-homogeneity along the circumference of the disc will not cause an anomalous reading at a particular laser power.

After writing according to the sequence as depicted in FIG. 3, jitter is measured a number of times at every ADIP/ATIP frame, and is averaged. Jitter may be measured using conventional techniques. For example, a timing measurement circuit in the recorder/player in question may be used in order to provide jitter measurements in relation to a clock signal for example.

Figure 4:
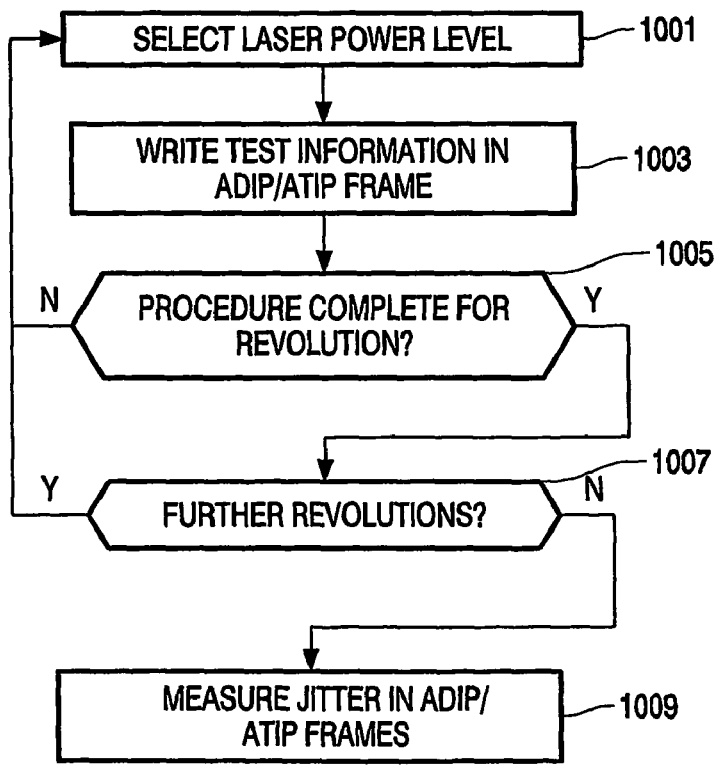
FIG. 4 is a flow chart of the method of the present invention.

The method of the present invention as exemplified by FIGS. 2 and 3 is depicted diagrammatically in FIG. 4 which shows a flow chart in accordance with the method of the present invention.

At step 1001, a power level is selected by the recorder. At step 1003, test information is written to an ADIP/ATIP frame using the power level selected at step 1001. At step 1005, the recorder determines whether the procedure is complete for a particular revolution, i.e. if all necessary power levels have been sampled. If yes, then it is determined at step 1007 whether further revolutions for the OPC procedure are required.

If further measurements are deemed necessary at step 1005, a new power level is selected at step 1001, and the OPC procedure continues.

If further revolutions are necessary at step 1007, a new laser write power is selected for the new revolution at step 1001. Alternatively, if no further revolutions are required, jitter is measured for the revolutions at step 1009.

Therefore, the method as outlined in FIG. 4 is repeated for each revolution of the disc. Jitter measurements start after the writing has been completed for each revolution.

It will be appreciated that the laser power levels need not necessarily be adjusted as depicted in FIG. 3, but may be adjusted in any manner provided that adjacent ADIP/ATIP frames in concentric tracks are not written with the same power level for the reasons outlined above.

When using an inner disc test zone, for example, 7 ADIP frames (for DVD+R(W)) are used per revolution, or 9 ATIP frames (for CD-R(W)) are used per revolution.

After writing with the different powers on ADIP/ATIP frame positions, jitter is measured. Once jitter has been measured at each ADIP/ATIP frame, enough information is available to average out the variations along the circumference of the disc. This will be explained in more detail below.

A table is shown below, which shows the jitter measurements for the power levels used during the test revolutions. In the table, n is the number of ADIP/ATIP frames that are written per revolution during the OPC procedure.

| Power Level | Jitter Measurement (1st revolution) | Jitter Measurement (2nd revolution) |
|---|---|---|
| $P_0$ | $\sigma_{0.1}$ | $\sigma_{0.2}$ |
| ... | ... | ... |
| $P_{n-1}$ | $\sigma_{(n-1).1}$ | $\sigma_{(n-1).2}$ |

FIG. 5 is a diagrammatic representation of two arrays obtained for power and jitter measurements using seven laser power levels per revolution for two revolutions. Jitter is measured at each power level for each revolution. For example, during a first revolution at a power level $P_0$, a jitter value $\sigma_{0.1}$ is obtained. Here, the subscript 0.1 indicates that it is the first (1) jitter measurement obtained from the first (zero-th) power level (0). Similarly, the seventh (6) jitter measurement (i.e. at the seventh power level) during the second (2) revolution is $\sigma_{6.2}$. The results are arranged in power level order $P_0$ to $P_6$, even though the power levels are applied in different orders for the different revolutions.

FIG. 6 depicts how, in an exemplary embodiment, the results from the measurements of FIG. 5 are averaged, the results of which are placed into two new arrays for power and jitter respectively.

In FIG. 6, two consecutive power and jitter values for both a first and a second revolution are averaged to provide the values of the new array. So, for example, the first two power levels for each revolution are $P_0$ and $P_1$, and the corresponding jitter measurements for the fast and second revolutions are $\sigma_{0.1}$, $\sigma_{1.1}$ and $\sigma_{0.2}$, $\sigma_{1.2}$ respectively. The two power levels are averaged to give the value $Po_0$ according to equation (1) below, and the four jitter measurements for the two revolutions at the two power levels are averaged to give $\sigma r1_0$ according to equation (2) below.

Therefore, averaging two consecutive power and jitter values (as described above) is performed using the following equations:

$$P_{0p} = (P_p + P_{p+1})/2 \,\forall p \in N : 0 \leq p \leq n-2 \qquad (1)$$

$$\sigma r1_p = (\sigma_{p.1} + \sigma_{p.2} + \sigma_{(p+1).1} + \sigma_{(p+1).2})/4 \,\forall p \in N : 0 \leq p \leq n-2 \qquad (2)$$

Similarly, FIGS. 7 and 8 show how three consecutive power and jitter values are averaged and placed into two further new arrays according to equations (3) and (4) below. Therefore, averaging of three consecutive power and jitter values of the above table is performed using the following equations:

$$P_{0q} = (P_q + P_{q+1} + P_{q+2})/3 \,\forall q \in N : 0 \leq q \leq n-3 \qquad (3)$$

$$\sigma r2_q = (\sigma_{q.1} + \sigma_{q.2} + \sigma_{(q+1).1} + \sigma_{(q+1).2} + \sigma_{(q+2).1} + \sigma_{(q+2).2})/6 \text{ for } \forall q \in N : 0 \leq q \leq n-3 \qquad (4)$$

The values from the four new arrays are now placed into two arrays as shown in FIGS. 9 and 10.

The four power/jitter arrays defined by equations (1) to (4) may now be stored into the two separate arrays given below:

$$Ps_{2p} = Po_p \, \sigma s_{2p} = \sigma r1_p \, \forall p \in N : 0 \leq p \leq n-2 \qquad (5)$$

$$Ps_{2.q+1} = Po_q \, \sigma s_{2.q+1} = \sigma r2_q \, \forall q \in N : 0 \leq q \leq n-3 \qquad (6)$$

This has the advantage of providing more samples which will enable a more accurate fit to be obtained when the average jitter is plotted against the average power.

It has been observed that the relationship between the averaged power levels $P_s$, and the averaged jitter values $\sigma_s$ is quadratic in nature as depicted in FIG. 11. The "+" marks 20 represent two averaged power and jitter values, and the "x" marks 22 represent three averaged power and jitter values.

In order to determine the power level that represents the minimum level of jitter, the minimum of the function relating $\sigma_s$ and $P_s$ ($\sigma_s = f(P_s)$) should be found (ideally by second order curve fitting). Given that the new function is observed to be quadratic, by finding solutions to the equation (in which a, b and c are constants):

$$\sigma_s = aP_s^2 + bP_s + c \qquad (7)$$

when $d\sigma_s/dP_s = 0$, we can calculate $P_s = P_{wo}$, where $P_{wo}$ is the optimal power.

FIG. 12 shows a typical plot of $\sigma_s$ vs. $P_s$. When $d\sigma_s/dP_s = 0$, we have:

$$2aP_{wo} + b = 0 \qquad (8)$$

and so $$P_{wo} = -b/(2a) \qquad (9)$$

where a and b are coefficients obtained from the polynomial regression. The new optimal power $P_{wo}$ corresponds to a minimal jitter value of the fitted curve.

Therefore, $P_{wo}$ is the optimum laser write power, i.e. the laser power that produces the minimum jitter value of the fitted curve, which is symmetrical about this minimum for a given disc/recorder combination at a given write speed.

It will be appreciated that in the exemplary embodiment given above, averages of two and three power and jitter values were used in order to calculate the optimum laser power. Averages over a larger or smaller number of power levels and associated jitter values are also possible however, and the above is only to illustrate the present invention. For example, if even greater accuracy of $P_{wo}$ is required, an average over 2, 3, 4 and 5 power levels and associated jitter values could be used to obtain the curve of FIG. 12.

The invention claimed is:

1. A method of determining an optimum power level for a laser device for writing to an optical storage medium, the method comprising acts of:
   defining a test region of the optical storage medium;
   using a laser device having an operating output power level, writing a predetermined data pattern to the test region;
   measuring jitter values for the predetermined data pattern; and
   selecting an optimum operating output power level of the laser device for writing data to the optical storage medium in dependence upon the measured jitter values, the optimum power level minimizing the jitter value for the optical storage medium,
   wherein during writing of the predetermined data pattern to the test region in a first scan of the medium, the operating output power level of the laser device is varied according to a first predetermined profile, and, during writing of the predetermined data pattern to the test region in a second scan of the medium, the operating output power level of the laser device is varied according to a second predetermined profile, different from the first predetermined profile such that a maximum power level is written at a different step in the first predetermined profile than a maximum power level is written in a corresponding step in the second predetermined profile.

2. The method as claimed in claim 1, wherein the predetermined profiles comprise a plurality of power level steps.

3. The method as claimed in claim 2, wherein at least one jitter value is measured for each of the power level steps of the first and second predetermined profiles.

4. The method as claimed in claim 3, wherein the act of selecting the optimum power level comprises acts of:
   determining a function which relates jitter value to power level, over the range of power levels in the first and second predetermined profiles;
   determining from said function an optimum power level that minimizes the jitter value.

5. The method as claimed in claim 4, wherein the act of determining the function relating jitter value to power level comprises acts of:
   for respective pairs of consecutive power levels, obtaining respective average power levels and respective average jitter values from the jitter values corresponding to those consecutive power levels; and
   determining a function which relates the average jitter values to the average power levels.

6. The method as claimed in claim 4, wherein the act of determining the function relating jitter value to power level comprises acts of:
   for respective triads of consecutive power levels, obtaining respective average power levels and respective average jitter values from the jitter values corresponding to those consecutive power levels; and
   determining a function which relates the average jitter values to the average power levels.

7. The method as claimed in claim 4, wherein the act of determining the function relating jitter value to power level comprises acts of:
   for respective pairs of consecutive power levels, obtaining respective average power levels and respective average jitter values from the jitter values corresponding to those consecutive power levels;
   for respective triads of consecutive power levels, obtaining respective average power levels and respective average jitter values from the jitter values corresponding to those consecutive power levels; and
   determining a function which relates the average jitter values to the average power levels.

8. The method as claimed in claim 5, wherein the function is a quadratic function of the form $\sigma = aP^2 + bP + c$, where $\sigma$ represents jitter value, P represents power level and a, b and c are constants, and the optimum power level is determined by setting the differential of the function to zero ($d\sigma/dP = 0$, $P_{optimum} = -b/2a$).

9. The method as claimed in claim 1, wherein the optical storage medium is a disc having address in pre-groove frames (ADIP) defined therein, and wherein the power level is varied for each ADIP frame of the disc.

10. The method as claimed in claim 1, wherein the optical storage medium is a disc having absolute time in pre-groove frames defined therein, and wherein the laser power level is varied for each ATIP frame of the disc.

11. The method as claimed in claim 1, wherein the optical recording medium comprises one of CD-R, CD-RW, DVD-R, DVD-RW, DVD-R_DL, DVD-RW_DL, DVD+R, DVD+RW, DVD+R_DL, DVD+RW_DL, DVD-RAM or Blu-Ray discs.

12. Apparatus for determining an optimum power level for a laser device for writing to an optical storage medium, the apparatus comprising:
    means for defining a test region of the optical storage medium;
    a laser device having an operating output power level, operable to write a predetermined data pattern to the test region;
    means for measuring jitter values for the predetermined data pattern; and
    means selecting an optimum operating output power level of the laser device for writing data to the optical storage medium in dependence upon the measured jitter values, the optimum power level minimizing the jitter value for the optical storage medium,
    power adjustment means operable, during writing of the predetermined data pattern to the test region in a first scan of the medium, to vary the operating output power level of the laser device according to a first predetermined profile, and, during writing of the predetermined data pattern to the test region in a second scan of the medium, to vary the operating output power level of the laser device according to a second predetermined profile, different from the first predetermined profile such that a maximum power level is written at a different step in the first predetermined profile than a maximum power level is written in a corresponding step in the second predetermined profile.

13. The apparatus as claimed in claim 12, wherein said means for selecting the optimum power level comprises:
    means for determining a function which relates jitter value to power level, over the range of power levels in the first and second predetermined profiles;

means for determining from said function an optimum power level that minimizes the jitter value.

14. The apparatus as claimed in claim 13, wherein said means for determining the function relating jitter value to power level comprises:
means for obtaining, for respective pairs of consecutive power levels, respective average power levels and respective average jitter values from the jitter values corresponding to those consecutive power levels; and
means for determining a function which relates the average jitter values to the average power levels.

15. The apparatus as claimed in claim 13, wherein said means for determining the function relating jitter value to power level comprises:
means for obtaining, for respective triads of consecutive power levels, respective average power levels and respective average jitter values from the jitter values corresponding to those consecutive power levels; and
means for determining a function which relates the average jitter values to the average power levels.

16. The apparatus as claimed in claim 13, wherein said means for determining the function relating jitter value to power level comprises:
means for obtaining, for respective pairs of consecutive power levels, respective average power levels and respective average jitter values from the jitter values corresponding to those consecutive power levels;
means for obtaining, for respective triads of consecutive power levels, respective average power levels and respective average jitter values from the jitter values corresponding to those consecutive power levels; and
means for determining a function which relates the average jitter values to the average power levels.

17. The apparatus as claimed in claim 12, wherein the optical storage medium is a disc having address in pre-groove frames (ADIP) defined therein, and wherein power adjustment means is operable to vary the power level for each ADIP frame of the disc.

18. The apparatus as claimed in claim 12, wherein the optical storage medium is a disc having absolute time in pre-groove frames defined therein, and wherein power adjustment means is operable to vary the laser power level for each ATIP frame of the disc.

19. The apparatus as claimed in claim 12, wherein the optical recording medium comprises one of CD-R, CD-RW, DVD-R, DVD-RW, DVD-R_DL, DVD-RW_DL, DVD+R, DVD+RW, DVD+R_DL, DVD+RW_DL, DVD-RAM or Blu-Ray discs.

20. The apparatus as claimed in claim 12, wherein the apparatus is a recording apparatus for recording data to a disc.

* * * * *